United States Patent [19]

Schutten et al.

[11] Patent Number: 4,706,174

[45] Date of Patent: Nov. 10, 1987

[54] SINGLE PHASE TO MULTIPHASE FREQUENCY MULTIPLIER

[75] Inventors: Herman P. Schutten; Robert W. Sackett, both of Milwaukee; Jan K. Sedivy, Elm Grove; Michael E. Taken, Cedarburg, all of Wis.

[73] Assignee: Eaton Corporation, Cleveland, Ohio

[21] Appl. No.: 402,866

[22] Filed: Jul. 29, 1982

[51] Int. Cl.⁴ .............................................. H02M 5/02
[52] U.S. Cl. ........................................ 363/9; 363/177
[58] Field of Search ...................................... 363/9-12, 363/157, 159, 160, 161, 163, 166, 169, 177, 163; 318/768, 800, 807

[56] References Cited

U.S. PATENT DOCUMENTS 3,718,854  2/1973  Spyrou et al. ....................... 363/160

FOREIGN PATENT DOCUMENTS 2515857  2/1976  Fed. Rep. of Germany ...... 363/160
  25925  7/1972  Japan .................................... 363/160
1077987  8/1967  United Kingdom ................ 363/160

OTHER PUBLICATIONS

"Power Transistor Applications for Switching Regulators and Motor Control", Marvin W. Smith, General Electric Co., Semi–Conductor Products Dept., Auburn, N.Y., Oct., 1979, pp. 22–23.

Primary Examiner—William H. Beha, Jr.
Attorney, Agent, or Firm—Andrus, Sceales, Starke & Sawall

[57] ABSTRACT

A single to multiphase AC frequency conversion technique is provided by alternately switching between a pair of AC power lines at a plurality of sets of coordinated but irregular times to yield a plurality of chopped sinusoid switched output waveforms each of a given frequency phase shifted from each other.

10 Claims, 4 Drawing Figures ns known, as well as various phase conversion techniques. The present invention provides a particularly simple combination of both frequency and phase conversion.

SINGLE PHASE TO MULTIPHASE FREQUENCY MULTIPLIER

BACKGROUND AND SUMMARY

Various AC frequency conversion techniques are known, as well as various phase conversion techniques. The present invention provides a particularly simple combination of both frequency and phase conversion.

One known frequency conversion technique is the inverter-converter approach which rectifies the AC current through a diode rectifier bridge or the like, and smoothes the rectified AC to level DC by means of a capacitor or the like. This level DC is then synthesized into a series of incremental steps to approximate a given sine wave voltage of desired frequency, for example "Power Transistor Applications for Switching Regulators and Motor Control", Marvin W. Smith, General Electric Company Semiconductor Products Department, Auburn, N.Y., October, 1979, Pages 22-23.

The present invention provides in combination a system having a plurality of coordinated but irregular sets of switching times performing in coordination the functions of rectification, frequency change, and single to multiphase conversion, directly from the AC line, without the diode bridge and without the DC filtering and DC synthesization.

DETAILED DESCRIPTION

Figure 1:
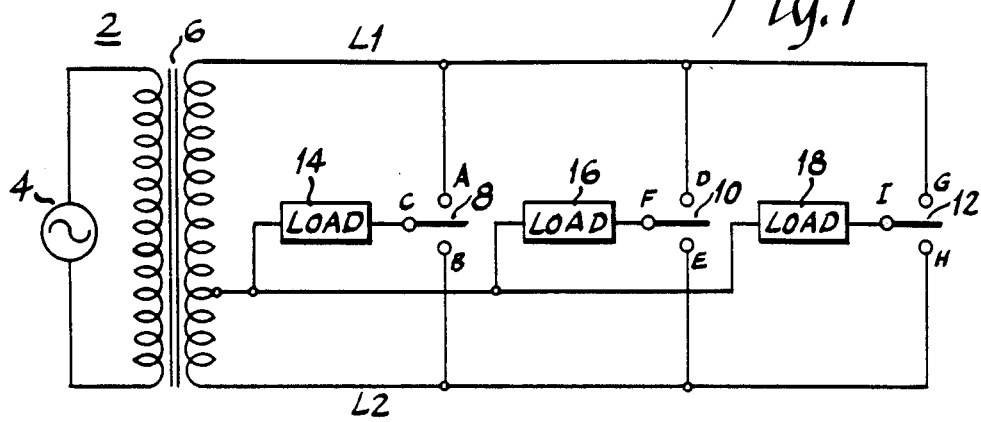
FIG. 1 is a schematic circuit diagram for illustrating the single to multiphase frequency conversion technique in accordance with the invention.

In FIG. 1, single to multiphase frequency conversion circuit 2 includes a pair of power lines L1 and L2 supplied with a single phase AC signal from AC source 4 through transformer 6. Switched output means 8, 10 and 12 are provided for alternately switching points C, F and I between points A and B, D and E, and G and H, respectively, of L1 and L2. Loads 14, 16 and 18 are connected between respective points C, F and I and a center tap of the transformer. Each of the switched output means 14, 16 and 18 preferably comprises a pair of power transistors, SCR's, or the like, connected from points A and B to point C, and from points D and E to point F, and from points G and H to point I, respectively, "Power Transistor Applications for Switching Regulators and Motor Control", Marvin W. Smith, General Electric Company Semiconductor Products Department, Auburn, N.Y., October, 1979, pages 22-23.

Figure 2:
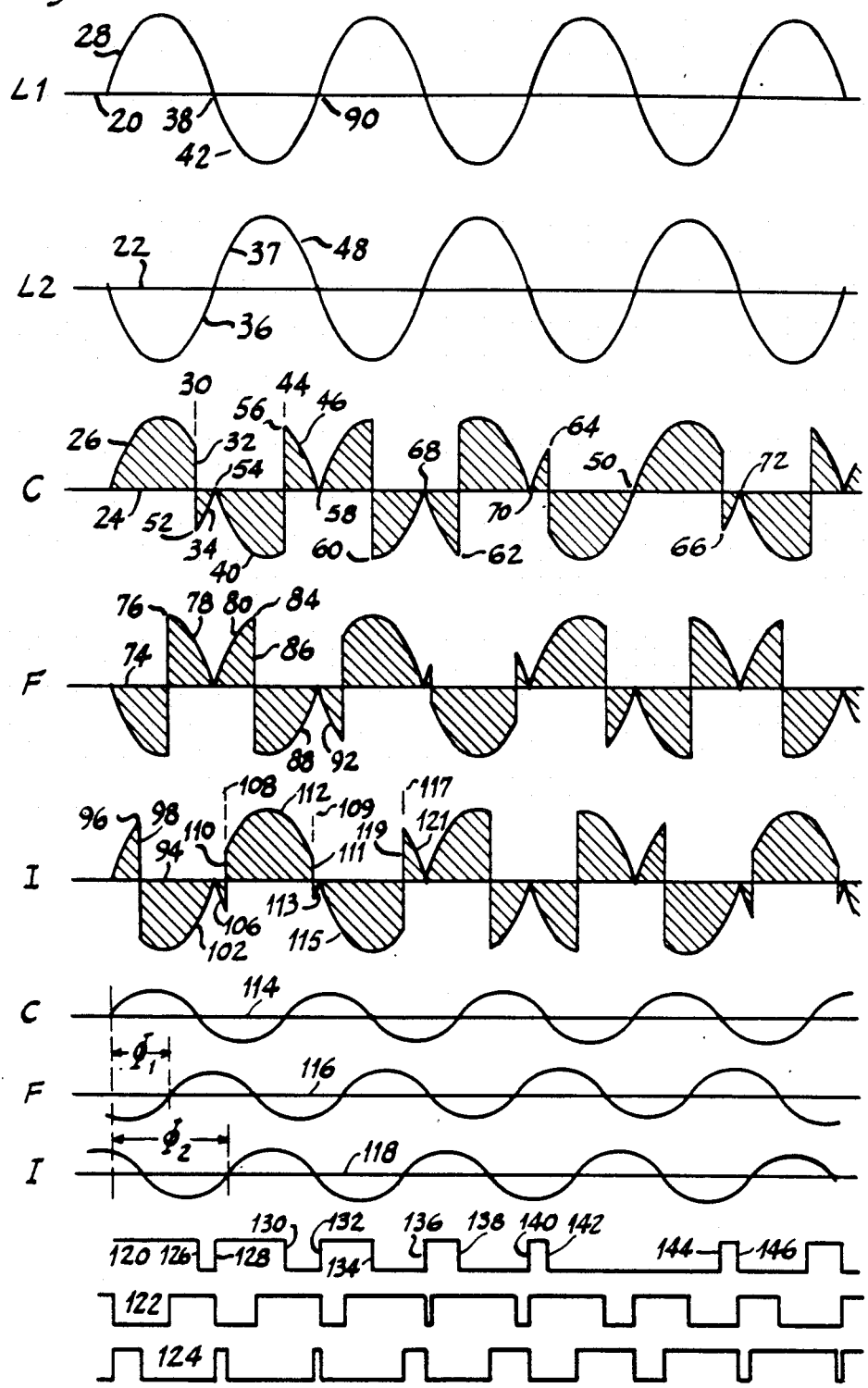
FIG. 2 is a timing diagram illustrating operation of the circuit of FIG. 1 in accordance with the invention.

FIG. 2 shows on timing line 20 the AC waveform on L1, and on timing line 22 the waveform on L2. Timing line 24 shows the switched output waveform at point C. Point C switches to L1 point A to provide output waveform segment 26 tracking waveform segment 28 on L1. At a given clock signal at 30 the switched output waveform on C switches to L2 point B as shown at transition 32, resulting in output waveform segment 34 which tracks segment 36 of L2. At zero crossing 38, the switched output 8 again toggles to connect point C to point A, resulting in output waveform segment 40 which tracks segment 42 of L1. The clock signal, which is of a given frequency, again occurs at 44, causing the output to switch to point B, resulting in output waveform segment 46 which tracks segment 48 of L2.

Analyzing timing line 24, the switched output waveform at C is a chopped sinusoid of a given frequency. In the example in FIG. 2, a 60 hertz single phase AC signal is provided from source 4, and a 72 hertz output signal is generated at point C. The output point C is switched between L1 and L2 in response to a 144 hertz clock signal, and is also switched between L1 and L2 in response to each zero crossing of the AC signal except when a zero crossing and a clock signal coincide in time, for example as shown at 50, timing line 24.

The chopped sinusoid output waveform on timing line 24 has an inflection point at each switched transition between A and B, for example inflection points 52, 54, 56, 58, etc., corresponding to switched transitions between A and B. Inflection points 52, 56, 60, 62, 64 and 66 are due to the given frequency clock signal, e.g. the 144 hertz clock. Inflection points 54, 58, 68, 70 and 72 are due to the zero crossing of the AC signal on L1 and L2. At 50, a zero crossing and a 144 hertz clock signal coincide, and the toggling of switch 8 is prevented so that there is no switched transition of the output waveform, i.e. point C remains connected to point B at time 50.

Timing line 74 shows the second switched output waveform on point F. At clock signal 76, point F switches to point D of L1 to provide output waveform segment 78 tracking a corresponding segment on L1. At zero crossing 38, the switched output 10 toggles to connect point F to point E of L2, resulting in output waveform segment 80 which tracks segment 37 of L2. At clock signal 84, the switched output waveform on F switches to L1 at D as shown at transition 86, resulting in output waveform segment 88 which tracks a correspondent segment of L1. At zero crossing 90 of the AC signal, switched output 10 again toggles to connect point F to point E resulting in output waveform segment 92 which tracks a correspondent segment of L2. In the example in FIG. 2, a 144 hertz clock signal is used on line 74 and delayed from the clock signal on line 24 by a given increment.

Timing line 94 shows the third switched output waveform on point I. At clock signal 96, point I switches to point H of L2 as shown at transition 98, to provide output waveform segment 102 tracking a correspondent waveform segment on L2. At zero crossing 38, point I switches to point G of L1 to provide output waveform segment 106 tracking a correspondent waveform segment on L1. At clock signal 108, switched output 12 again toggles to connect point I to point H as shown at transition 110, resulting in output waveform segment 112 which tracks a correspondent segment of L2. At clock signal 109, switched output 12 again toggles to connect point I to point G as shown at transition 111, resulting in output waveform segment 113 which tracks a correspondent segment of L1. At zero crossing 90, point I switches to point H of L2 to provide output waveform segment 115 tracking a correspondent waveform segment on L2. At clock signal 117, point I switches to point G of L1 as shown at transition 119, resulting in output waveform segment 121 which tracks a correspondent segment of L1. In the example in FIG. 2, a 144 hertz clock signal is used on timing line 94 and is further delayed from the clock signal on line 24 by a further given increment which is greater than the delay increment of the clock on line 74.

Timing line 114 shows the fundamental frequency component of the waveform on timing line 24. Timing line 116 shows the fundamental frequency component of the waveform on timing line 74. Timing line 118 shows the fundamental frequency component of the waveform on line 94. It is seen that there is a phase differential $\phi_1$ between the switched output waveforms at points C and F. It is also seen that there is a phase differential $\phi_2$ between the switched output waveforms at points C and I. The single phase 60 hertz AC input has thus been converted to a three phase 72 hertz output, with the switched output waveforms at points C, F and I each being out of phase with one another.

The output waveforms at points C, F and I each have a positive half cycle during which it is switched to L1 when L1 is positive and switched to L2 when L2 is positive. Each output waveform has a negative half cycle during which it is switched to L1 when L1 is negative and switched to L2 when L2 is negative. The chopped sinusoid switched output waveform is not as efficient as the input 60 hertz waveform. This is because of the chopping and reversal of the various waveform segments preventing build-up of voltage. For example, in the output waveform at point C on timing line 24, in the negative half cycle provided by waveform segments 34 and 40, the voltage rises negatively and then falls back to zero at 54 and then rises negatively again. This is not as efficient as a half cycle of a non-chopped sinusoid, but may be tolerated in certain applications.

An exemplary application is where an increase in frequency is desired for only short periods of time compared with normal lower frequency run-time. An example is refrigeration control where the compressor must be designed for the worst case situation. Even though such worst case occurs perhaps only 1% of the time, for example when a freezer must cool down a whole new supply of food. During the other 99% of the time, the compressor must only maintain an already cool condition, and thus may only need perhaps half its capacity. One solution to this over-capacity is to use a smaller compressor and run it at normal speed for normal duty, and run it at a higher speed during the small percentage of time needed for higher capacity cooling, i.e. during the 1% cool-down time. This faster speed operation is not detrimental to the compressor for short periods of time. In FIG. 2, a tradeoff in the frequency conversion technique is that the resultant chopped sinusoid output waveform of increased frequency is less efficient than the input AC frequency. This less efficient use of electrical power is far outweighed by the reduction in compressor capacity enabled thereby. Furthermore, during the 99% normal run-time, a smaller compressor is driven by a smaller motor at its most efficient load rating.

Timing lines 120, 122 and 124 show the irregular switching times for toggling output switches 14, 16 and 18, respectively between points A and B, D and E, and G and H, respectively. In the output waveform at C as shown on timing line 24, each inflection point corresponds to a switched transition between A and B on timing line 120. For example, inflection points 52, 54, 56, 58, 60, 68, 62, 70, 64, 66 and 72 correspond respectively to switched transitions 126, 128, 130, 132, 134, 136, 138, 140, 142, 144 and 146 between A and B on timing line 120. Each inflection point in the waveforms at points F and I on timing lines 74 and 94 likewise correspond to a switched transition between D and E and between G and H, respectively, on timing lines 122 and 124.

The irregular switching patterns shown on timing lines 120, 122 and 124 perform the functions of chopping the incoming AC signal for frequency conversion, rectifying the signal as previously performed by a diode rectifier bridge or the like, and phase shifting for conversion to a three phase output. In one implementation, this cumulative irregular timing pattern is provided by exclusively ORing the given frequency clock signal and the zero crossings of the AC signal to toggle point C between L1 and L2 at A and B, and exclusively ORing a delayed said clock signal and the zero crossings of the AC signal to toggle point F between L1 and L2 at D and E, and exclusively ORing a further delayed said clock signal and the zero crossings of the AC signal to toggle point I between L1 and L2 at G and H.

Figure 3:
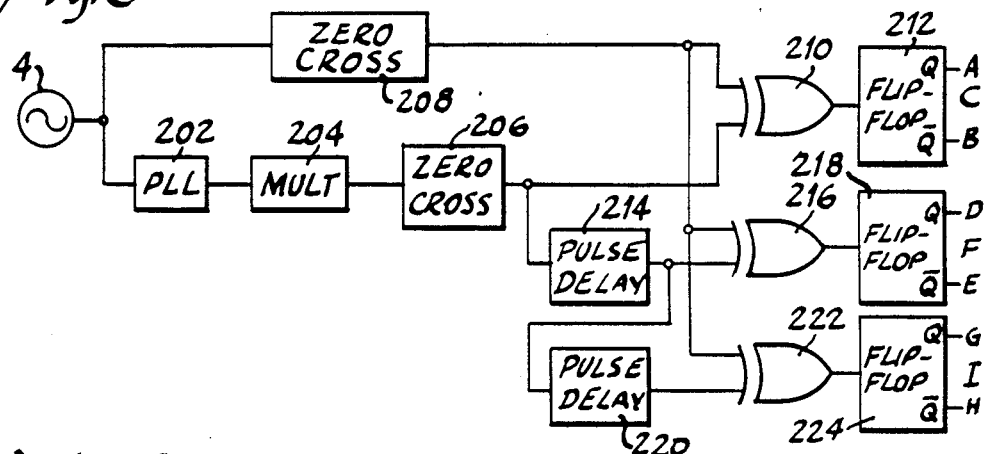
FIG. 3 is a schematic circuit diagram illustrating a timing control for providing the timing in FIG. 2.

FIG. 3 shows one form of the preferred implementation where the given frequency clock signal is provided by a phase-lock loop 202 extracting the frequency of the AC signal from source 4, which frequency is multiplied by a clock multiplier 204 or the like such as a frequency synthesizer, and output to a zero crossing detector 206, whose output provides the clock signal. For the timing in FIG. 2, the multiplication factor in multiplier 204 is 6/5. A zero crossing detector 208 is also provided to detect zero crossings of the AC signal from source 4. The clock signal from 206 and the zero crossings from 208 are input to an exclusive OR gate 210 whose output toggles a flip-flop 212 between its Q and $\bar{Q}$ outputs to switch between A and B.

The clock signal from 206 is also delivered to a pulse delay 214. The delayed clock signal from 214 and the zero crossings from 208 are input to a second exclusive OR gate 216 whose output toggles another flip-flop 218 to switch between D and E. The output of pulse delay 214 is delivered to another pulse delay 220. The further delayed clock signal from 220 and the zero crossings from 208 are input to a third exclusive OR gate 222 whose output toggles a flip-flop 224 to switch between G and H.

Figure 4:
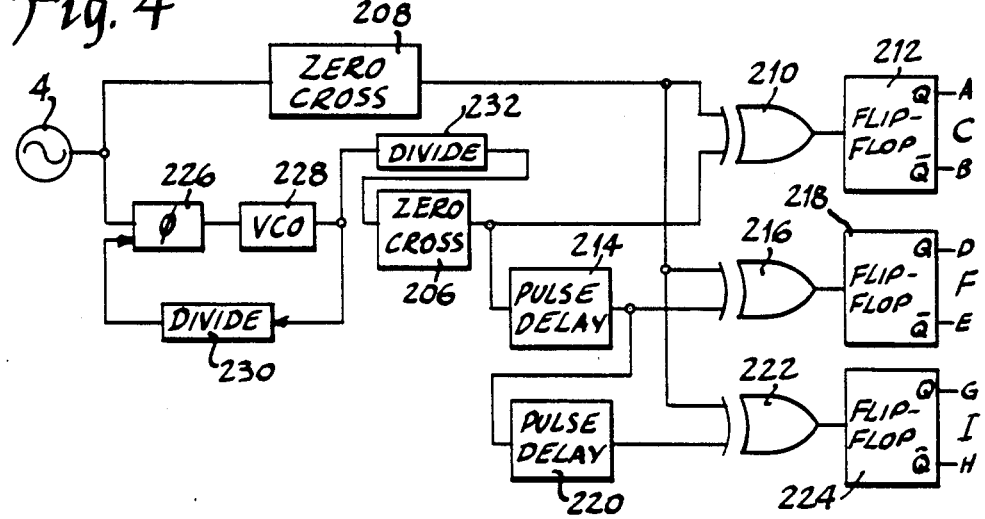
FIG. 4 is a schematic circuit diagram of an alternate timing control for providing the timing in FIG. 2.

FIG. 4 shows another timing control and like reference characters are used as in FIG. 3 where appropriate to facilitate clarity. Phase detector 226 and voltage controlled oscillator 228 of the phase-lock loop have a feedback divider 230, such as a counter, connected from the output of VCO 228 to the input of phase detector 226. As is known, if divider 230 performs a divide by six operation, then the output of VCO 228 will have a frequency six times as great as the input from source 4. The output of VCO 228 is delivered to a divider 232 which in the above example performs a divide by five operation, such that the output of divider 232 has a frequency 6/5 as great as the input from source 4. This multiple of the AC signal is delivered to zero crossing detector 206, whose output is the clock signal.

It is recognized that various modifications are possible within the scope of the appended claims.

We claim:

1. A single to multiphase frequency conversion technique for an AC signal supplied to a pair of power lines L1 and L2 by an AC source, comprising alternately switching between said power lines by first switching to L1 and then switching to L2 and then switching back to L1 and so on at a plurality of sets of irregular times at any point in the AC cycle to yield a plurality of chopped sinusoid switched output waveforms each of any given up-converted output frequency phase shifted from each other.

2. A single to multiphase frequency conversion technique for an AC signal supplied to a pair of power lines L1 and L2 by an AC source, comprising alternately switching between said power lines at a plurality of sets of irregular times to yield a plurality of switched output waveforms each of a given frequency phase shifted from each other, wherein each said switched output waveform comprises a chopped sinusoid, and comprising:

switching between L1 and L2 in response to a given frequency clock signal and also switching between L1 and L2 in response to each zero crossing of said AC signal except when said zero crossing and said clock signal coincide in time, to yield a first chopped sinusoid switched output waveform; and switching between L1 and L2 in response to a delayed said clock signal and also switching between L1 and L2 in respone to each zero crossing of said AC signal except when said zero crossing and said delayed clock signal coincide in time, to yield a second chopped sinusoid switched output waveform.

3. The invention according to claim 2 comprising switching between L1 and L2 in response to a further delayed said clock signal and also switching between L1 and L2 in response to each zero crossing of said AC signal except when said zero crossing and said further delayed clock signal coincide in time, to yield a third chopped sinusoid switched output waveform out of phase with both of said first and second switched output waveforms, whereby to afford a three phase output.

4. The invention according to claim 3 wherein each of said three chopped sinusoid switched output waveforms has an inflection point at each switched transition thereof between L1 and L2.

5. The invention according to claim 4 comprising exclusively ORing said clock signal and said zero crossings of said AC signal to toggle said first output waveform between L1 and L2, exclusively ORing said delayed clock signal and said zero crossings of said AC signal to toggle said second output waveform between L1 and L2, and exclusively ORing said further delayed clock signal and said zero crossings of said AC signal to toggle said third output waveform between L1 and L2.

6. A single to multiphase frequency conversion technique for an AC signal supplied to a pair of power lines L1 and L2 by an AC source, comprising alternately switching between said power lines at a plurality of sets of irregular times to yield a plurality of switched output waveforms each of a given frequency phase shifted from each other, wherein each said switched output waveform comprises a chopped sinusoid, and comprising:

providing a first chopped sinusoid switched output waveform by switching between L1 and L2 at a given multiple of the frequency of zero crossings of said AC signal, and also switching between L1 and L2 in response to each zero crossing of said AC signal except when said zero crossing and said multiple coincide in time; and providing a second chopped sinusoid switched output waveform by switching between L1 and L2 at a delayed said given multiple of the frequency of zero crossings of said AC signal, and also switching between L1 and L2 in response to each zero crossing of said AC signal except when said zero crossing and said delayed given multiple coincide in time.

7. The invention according to claim 6 comprising providing a third chopped sinusoid switched output waveform by switching between L1 and L2 at a further delayed said given multiple of the frequency of zero crossings of said AC signal, and also switching between L1 and L2 in response to each zero crossing of said AC signal except when said zero crossing and said further delayed multiple coincide in time, whereby to afford a three phase output.

8. The invention according to claim 7 wherein:

said first output waveform has a positive half cycle during which it is switched to L1 when L1 is positive and switched to L2 when L2 is positive, and said first output waveform has a negative half cycle during which it is switched to L1 when L1 is negative and switched to L2 when L2 is negative;

said second output waveform has a positive half cycle during which it is switched to L1 when L1 is positive and switched to L2 when L2 is positive, and said second output waveform has a negative half cycle during which it is switched to L1 when L1 is negative and switchec to L2 when L2 is negative; and said third output waveform has a positive half cycle during which it is switched to L1 when L1 is positive and switched to L2 when L2 is positive, and said third output waveform has a negative half cycle during which it is switched to L1 when L1 is negative and switched to L2 when L2 is negative.

9. The invention according to claim 8 wherein:

said first output waveform is switched between L1 and L2 by exclusively ORing said multiple and said zero crossings of said AC signal to provide first chopped sinusoid output waveform having an inflection point at each switched transition between L1 and L2;

said second output waveform is switched between L1 and L2 by exclusively ORing said delayed multiple and said zero crossings of said AC signal to provide a second chopped sinusoid output waveform having an inflection point at each switched transition between L1 and L2; and said third output waveform is switched between L1 and L2 by exclusively ORing said further delayed multiple and said zero crossings of said AC signal to provide a third chopped sinusoid output waveform having an inflection point at each switched transition between L1 and L2.

10. Single to multiphase frequency conversion apparatus for an AC signal comprising:

a pair of power lines L1 and L2 supplied with a single phase AC signal from an AC source;

first switched output means for alternately switching between L1 and L2 at irregular times to yield a first chopped sinusoid switched output waveform of a given frequency, and including given frequency clock signal means, zero crossing detector means for said AC signal, and means for exclusively ORing the output of said clock signal means and said zero crossing means for switching between L1 and L2 in response to a given frequency clock signal and also switching between L1 and L2 in response to each zero crossing of said AC signal except when said zero crossing and said clock signal coincide in time, such that said first chopped sinusoid switched output waveform has a positive half cycle during which it is switched to L1 when L1 is positive and switched to L2 when L2 is positive, and such that said first chopped sinusoid switched output waveform has a negative half cycle during which it is switched to L1 when L1 is negative and switched to L2 when L2 is negative;

second switched output means for alternately switching between L1 and L2 at irregular times to yield a second chopped sinusoid switched output waveform of said given frequency but phase shifted from said first output waveform, and including means for delaying said given frequency clock signal, and means for exclusively ORing the output of said delayed clock signal means and said zero crossing means for switching between L1 and L2 in response to said given frequency delayed clock signal and also switching between L1 and L2 in response to each zero crossing of said AC signal except when said zero crossing and said delayed clock signal coincide in time, such that said second chopped sinusoid switched output waveform has a positive half cycle during which it is switched to L1 when L1 is positive and switched to L2 when L2 is positive, and such that said second chopped sinusoid switched output waveform has a negative half cycle during which it is switched to L1 when L1 is negative and switched to L2 when L2 is negative; and third switched output means for alternately switching between L1 and L2 at irregular times to yield a third chopped sinusoid switched output waveform of said given frequency but phase shifted from each of said first and second output waveforms, and including means for further delaying said given frequency clock signal, and means for exclusively ORing the output of said further delayed clock signal means and said zero crossing means for switching between L1 and L2 in response to said given frequency further delayed clock signal and also switching between L1 and L2 in response to each zero crossing of said AC signal except when said zero crossing and said further delayed clock signal coincide in time, such that said third chopped sinusoid switched output waveform has a positive half cycle during which it is switched to L1 when L1 is positive and switched to L2 when L2 is positive, and such that said third chopped sinsoid switched output waveform has a negative half cycle during which it is switched to L1 when L1 is negative and switched to L2 when L2 is negative.

* * * * *